No. 738,264. PATENTED SEPT. 8, 1903.
O. E. WAXEL.
POWER PRODUCER.
APPLICATION FILED JUNE 25, 1902.
NO MODEL. 8 SHEETS—SHEET 1.
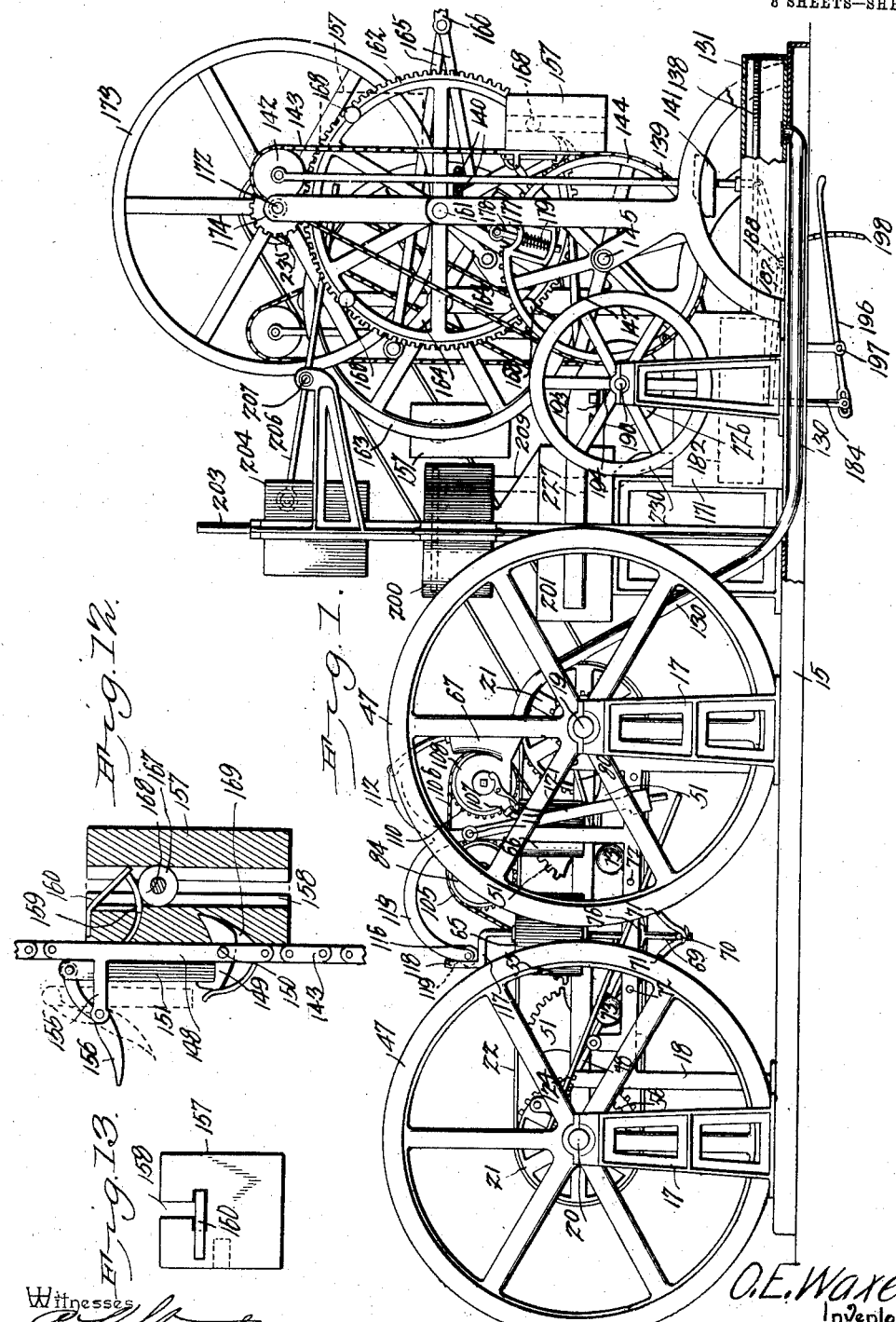
Witnesses
O. E. Waxel,
Inventor.
Attorneys.

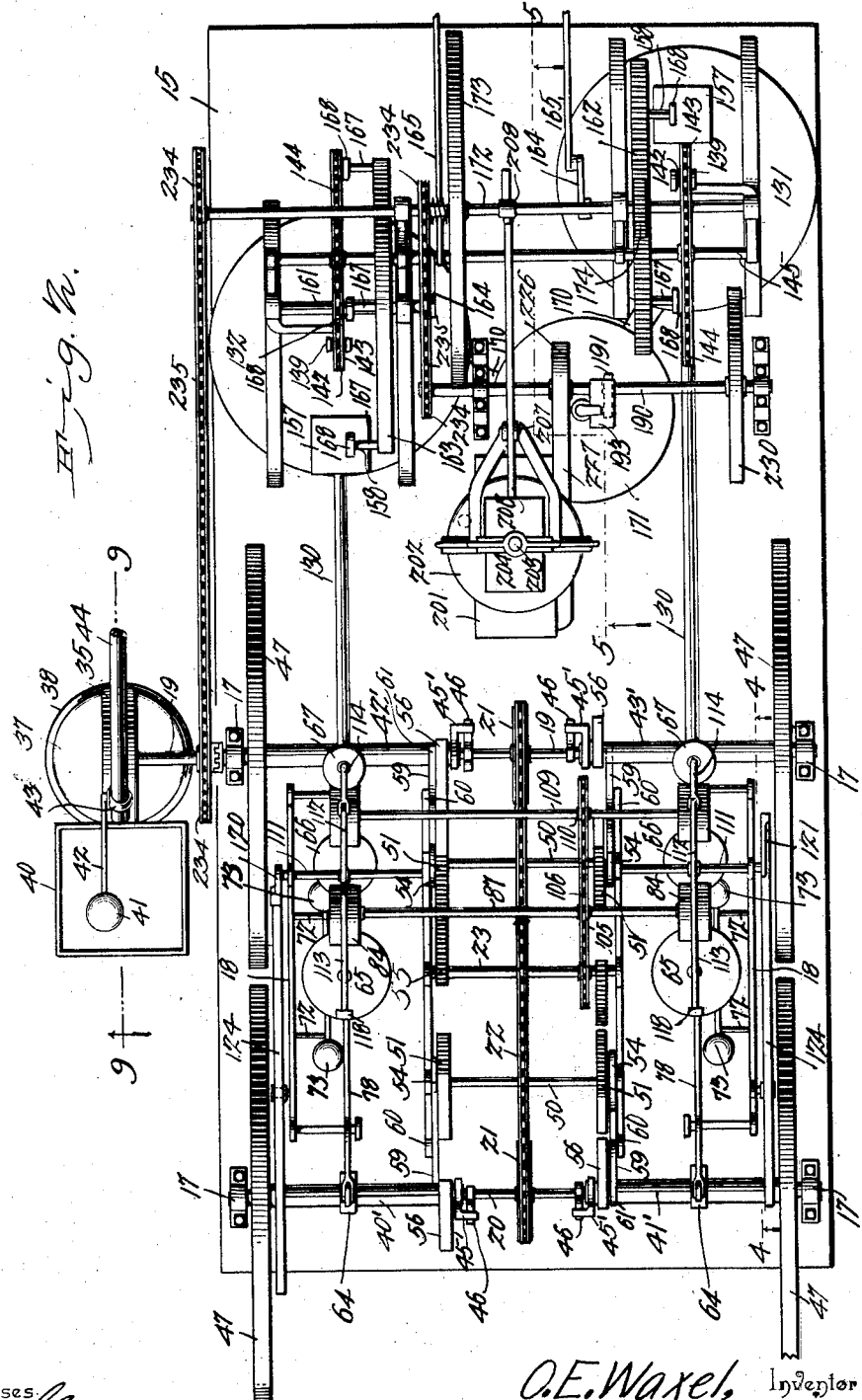

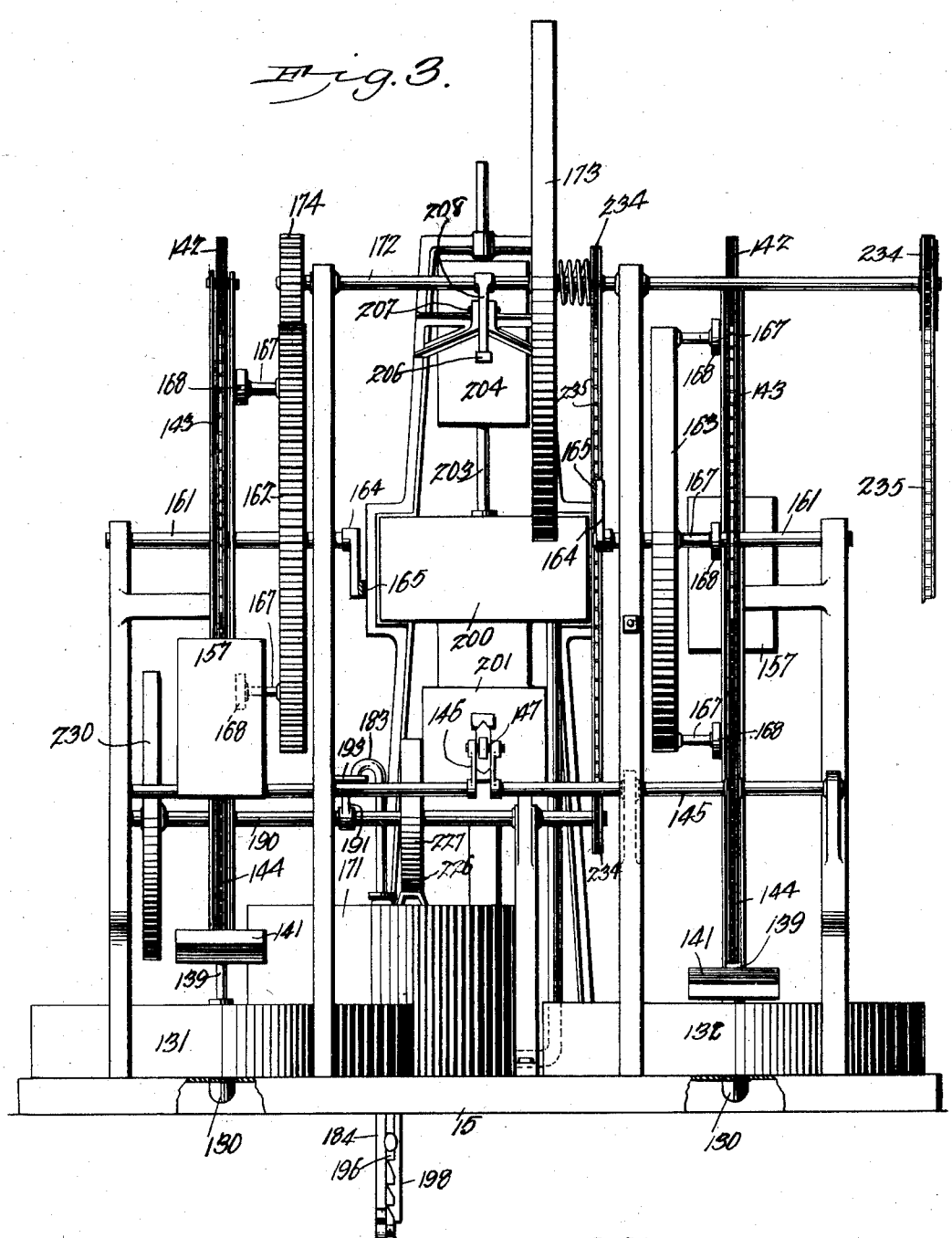

No. 738,264. PATENTED SEPT. 8, 1903.
O. E. WAXEL.
POWER PRODUCER.
APPLICATION FILED JUNE 25, 1902.
NO MODEL. 8 SHEETS—SHEET 4.
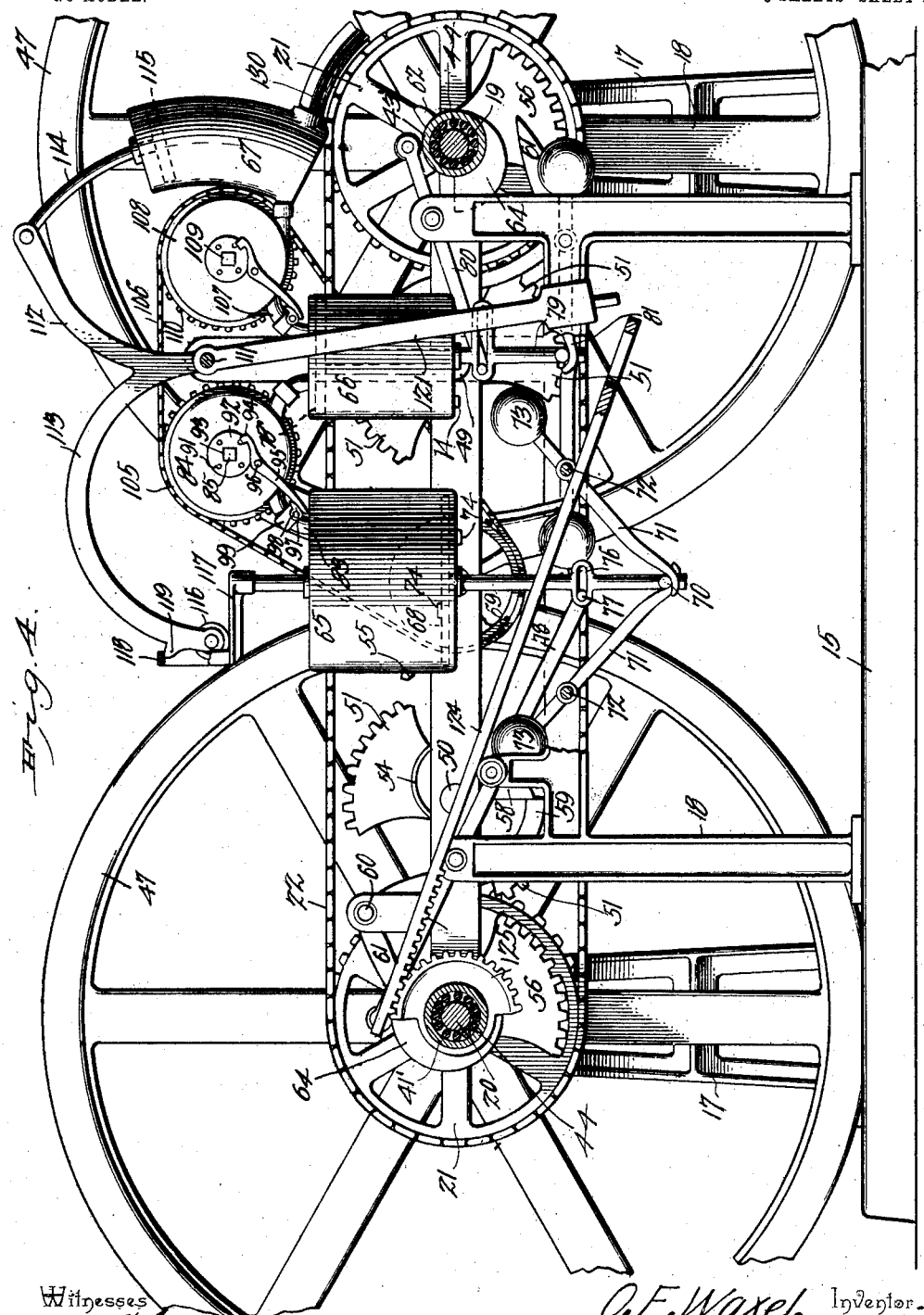

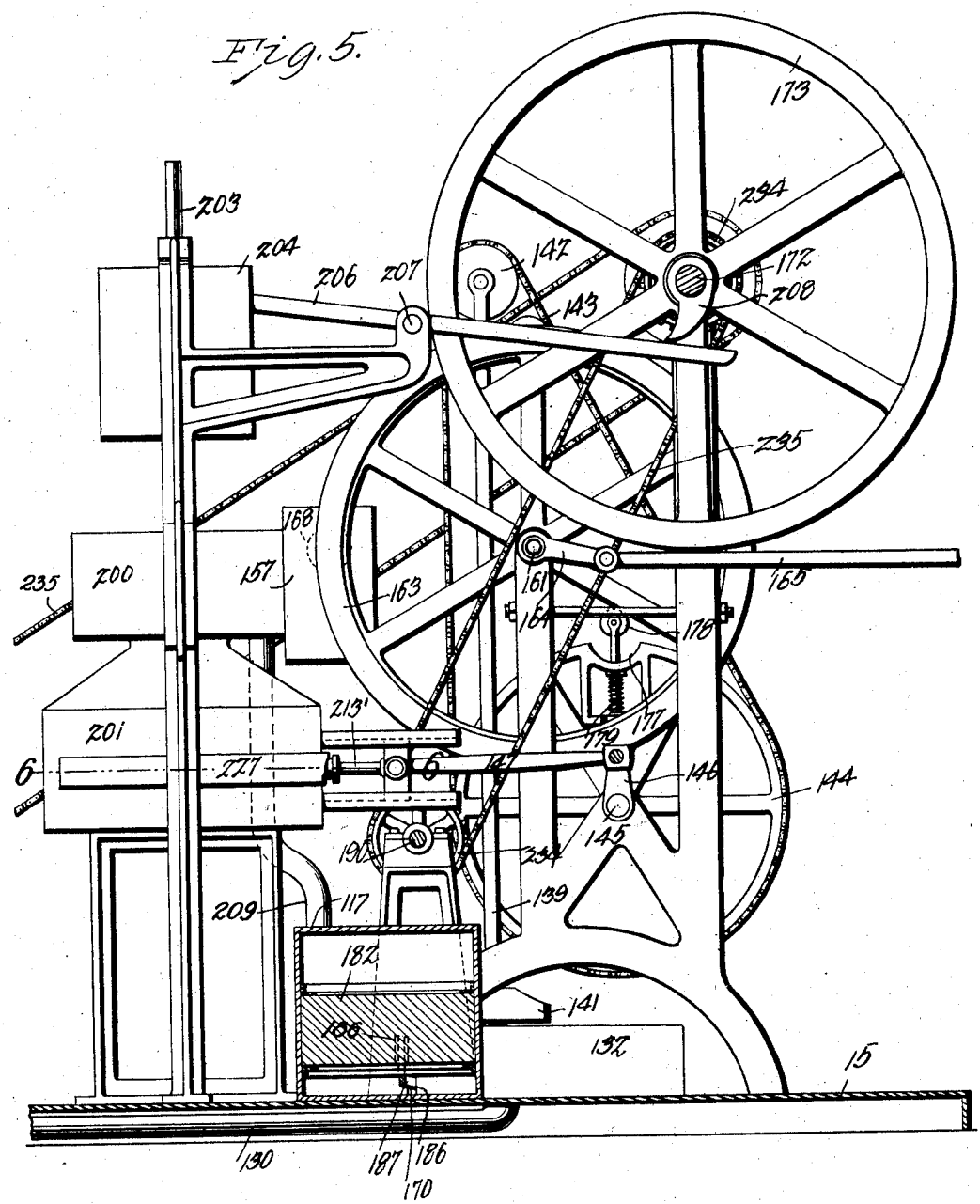

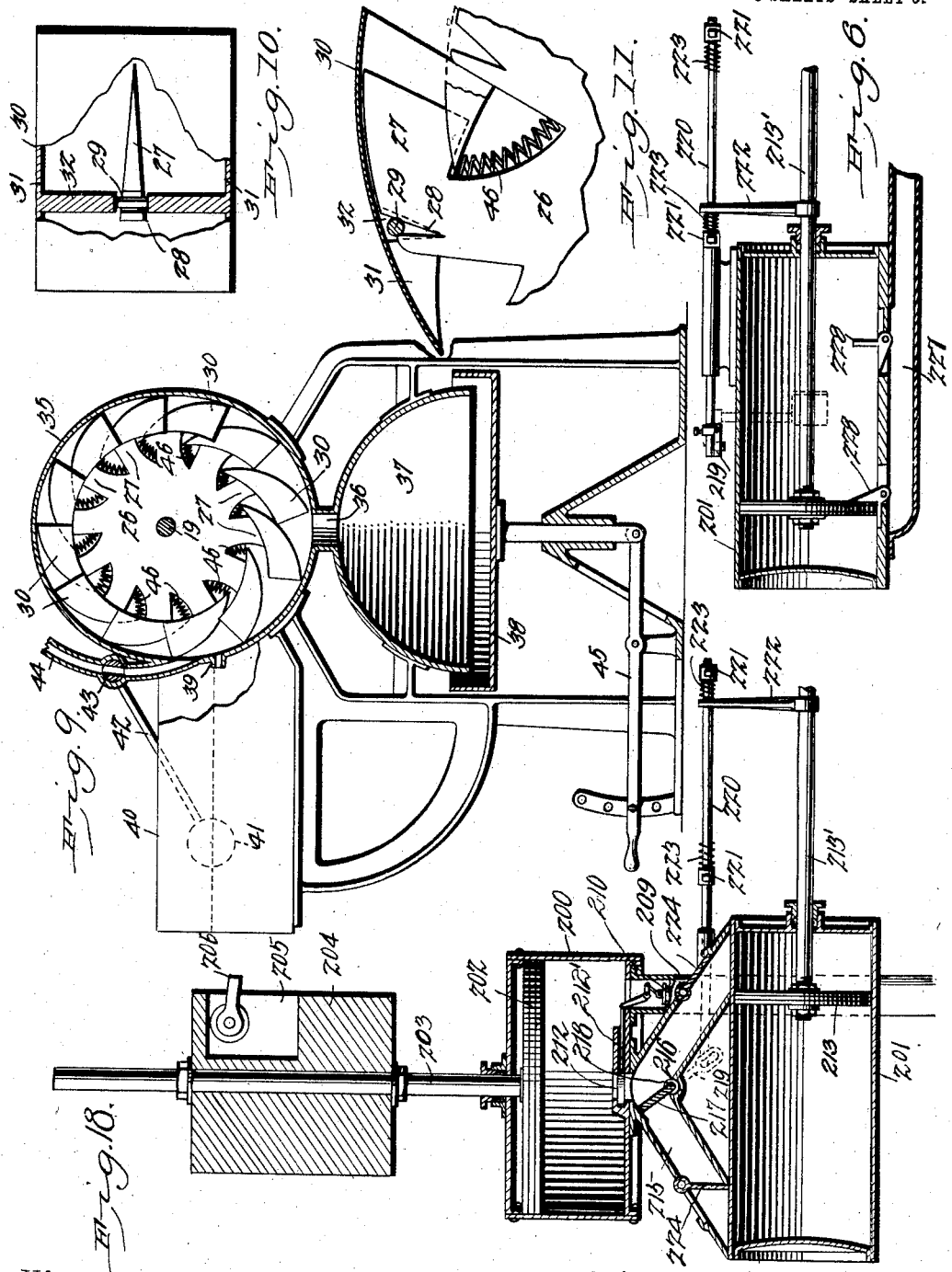

No. 738,264. PATENTED SEPT. 8, 1903.
O. E. WAXEL.
POWER PRODUCER.
APPLICATION FILED JUNE 25, 1902.
NO MODEL. 8 SHEETS—SHEET 7.
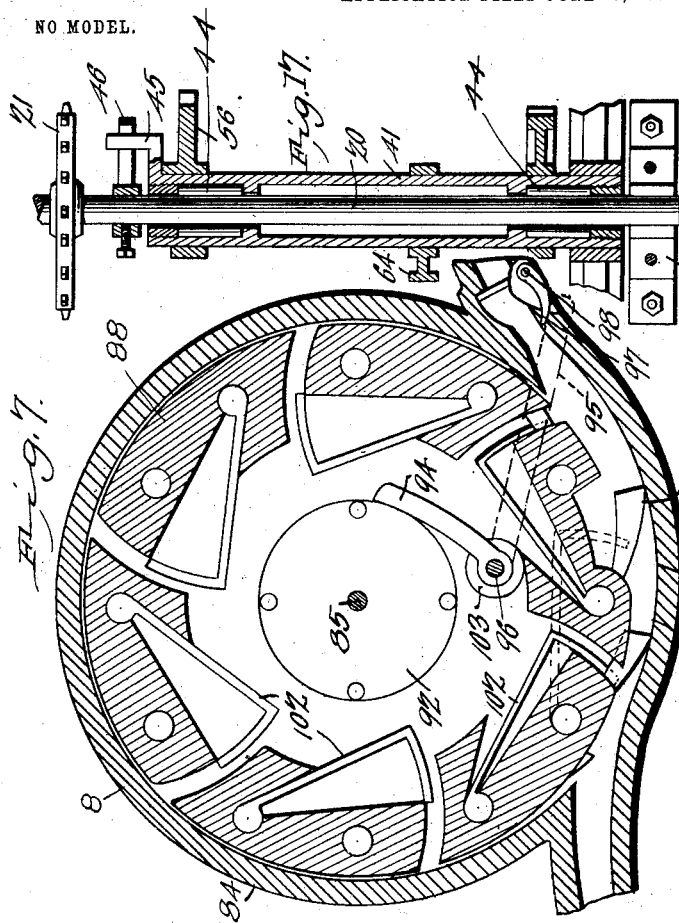
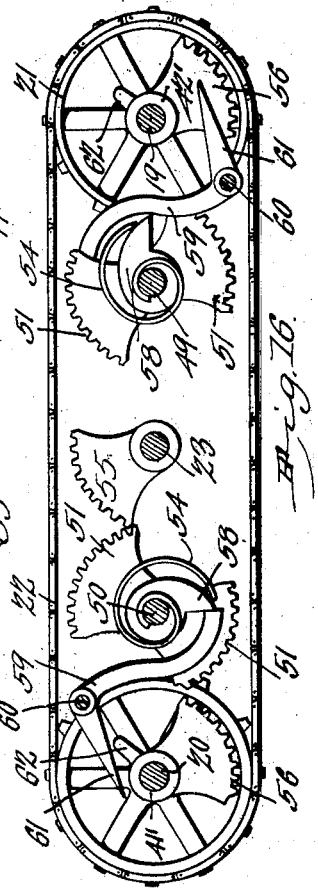
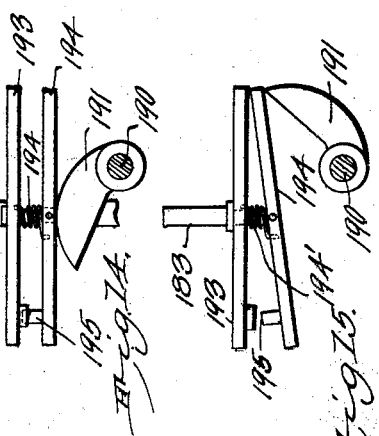
Witnesses
O. E. Waxel, Inventor.
by C. A. Snow & Co.
Attorneys

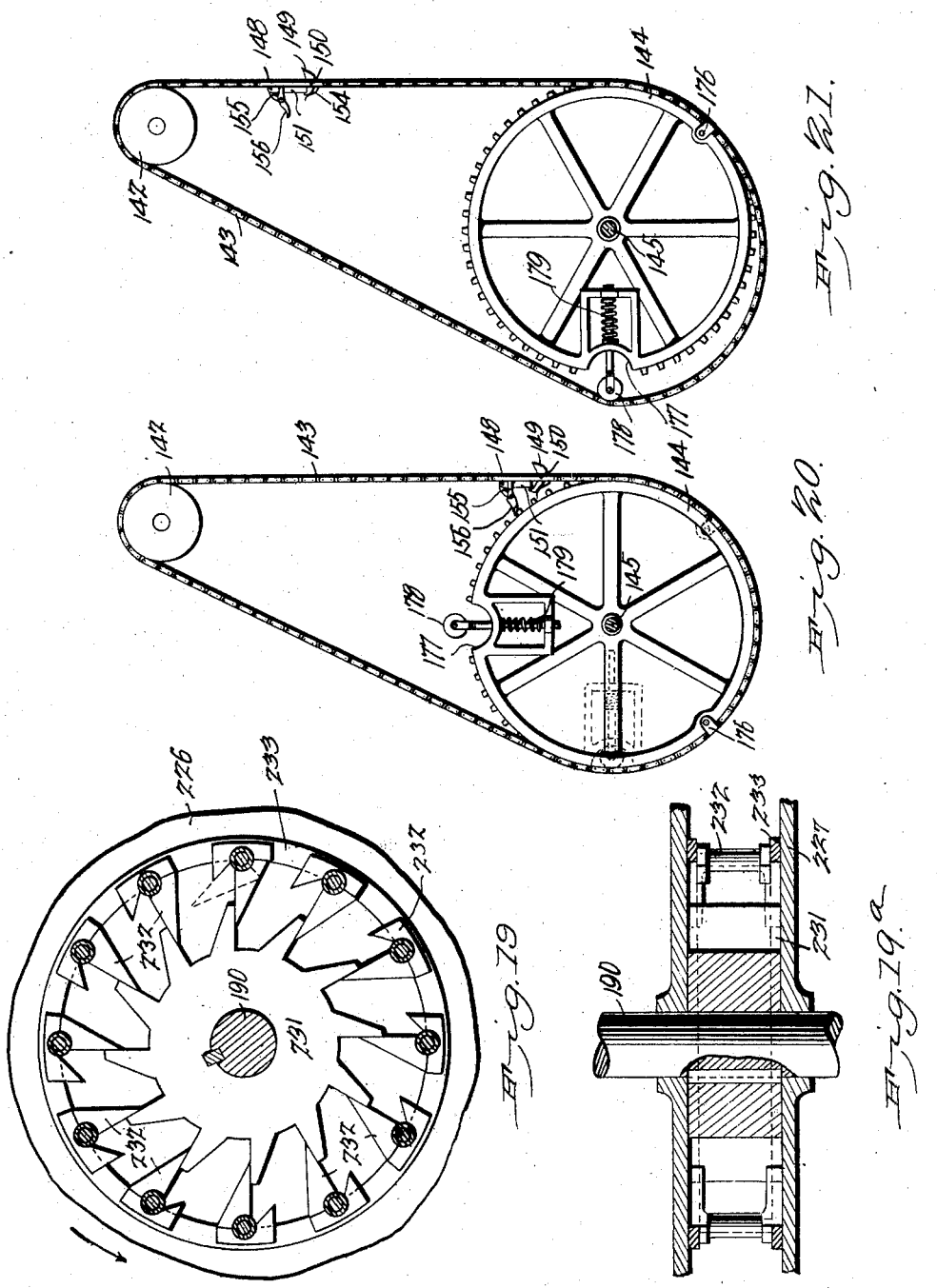

No. 738,264.

Patented September 8, 1903.

UNITED STATES PATENT OFFICE.

OLE E. WAXEL, OF OAKLAND, CALIFORNIA.

POWER-PRODUCER.

SPECIFICATION forming part of Letters Patent No. 738,264, dated September 8, 1903.

Application filed June 25, 1902. Serial No. 113,179. (No model.)

*To all whom it may concern:*

Be it known that I, OLE E. WAXEL, a citizen of the United States, residing at Oakland, in the county of Alameda and State of California, have invented a new and useful Power-Producer, of which the following is a specification.

This invention relates to certain improvements in power-producing devices, and has for its principal object to provide mechanism whereby any available power may be utilized for effecting the gradual compression of air, the mechanism employed being of especial value for utilizing the weight and pressure of water supplied from any source or for utilizing the pressure of water flowing through air-tight pipes leading into or from reservoirs or where water is transmitted through pipes from one place to another for any purpose.

In carrying out my invention I employ the power obtained from the water-pressure or other source in gradually compressing air, allowing the compressed air to cool, and then recompressing it or reducing its volume, meantime employing the air for the purpose of transmitting motion to suitable operative devices the kinetic and potential energies of which are afterward utilized for transmitting motion to other connected and operative mechanisms which in turn are used in the successive recompressions of the air until the latter has obtained the highest degree of compression possible from the initial source of power, after which the air is permitted to expand and its energy utilized partly in operating the compression mechanism and partly for the driving of any suitable connected machine or mechanism which may be employed to utilize the energy.

In carrying out my invention I employ a specially-constructed water-wheel which receives an initial impulse under the pressure and weight of water and drives the apparatus. This initial power is then employed to compress air or other fluid, the air passing between successive compression-cylinders and its flow and to some extent its pressure being utilized to impart motion to a series of connected mechanisms which receive motion at a greater or less speed in accordance with their positions, the various elements of the apparatus being mutually connected, so that motion imparted at a high rate of speed to one or more of such elements will be transmitted to parts of the mechanism operating at a slow rate of speed, and vice versa.

A further object of the invention is to so arrange and connect the various portions of the mechanism that those elements about to impart motion to other connected elements will receive from other connected elements of the apparatus an impulse or movement which will materially assist the operation and render the working of the apparatus more steady and uniform.

With these and other objects in view the invention consists in the novel construction and combination of parts hereinafter described, illustrated in the accompanying drawings, and particularly pointed out in the appended claims.

In the drawings, Figure 1 is a side elevation of an apparatus constructed in accordance with my invention, portions of the apparatus being broken away in order to more fully and clearly illustrate the construction. Fig. 2 is a plan view of the same. Fig. 3 is an end elevation of the device, drawn to a somewhat larger scale. Fig. 4 is a longitudinal sectional elevation of a portion of the mechanism on the line 4 4 of Fig. 2. Fig. 5 is a similar view on the line 5 5 of Fig. 2. Fig. 6 is a sectional plan view of a portion of the mechanism on the line 6 6 of Fig. 5. Fig. 7 is a detail sectional view, on an enlarged scale, illustrating the construction of one of the air-driven wheels employed at a number of the points in the apparatus. Fig. 8 is a sectional elevation of a portion of the same on the line 8 8 of Fig. 7, illustrating particularly the construction of the clutching mechanism employed. Fig. 9 is a sectional elevation of the preferred form of initial power-wheel which it is proposed to employ, the section being taken on the plane indicated by the line 9 9 of Fig. 2 and drawn to a somewhat larger scale. Figs. 10 and 11 are detailed views of the construction of the water-wheel, and more particularly referred to hereinafter. Fig. 12 is a sectional elevation taken on the line 12 12 of Fig. 13 and illustrating the construction of one of the weights the potential energy of which is transmitted to a revoluble wheel at the right-hand end of the mechanism shown in Fig. 2. Fig. 13 is a plan view of the weight. Figs. 14 and 15 are detailed views of an escapement mechanism employed for the transmission of alternate movements of a rotatable cam to a reciprocating element of the apparatus. Fig. 16 is a detail view of a portion of the mechanism for transmitting impulses at comparatively high speed to normally slowly moving elements immediately before the energy of the latter is to be utilized. Fig. 17 is a sectional plan view of a portion of the mechanism, more particularly referred to hereinafter. Fig. 18 is a detail sectional view of a portion of the mechanism, drawn to an enlarged scale. Figs. 19, 19$^a$, 20, and 21 are views of details of construction.

Similar numerals of reference are employed to designate corresponding parts throughout the several figures of the drawings.

15 designates a base or bed plate, at one end of which is a frame comprising opposite standards 17 and side frames 18, which may be of any suitable size, in accordance with the capacity of the apparatus. In the standards 17 are arranged bearings for the support of two transversely-disposed shafts 19 and 20, each of which is provided with a sprocket-wheel 21, the two sprocket-wheels being connected by a link belt 22. At a central point between the two shafts and in a horizontal plane therewith is arranged a shaft 23, having a gear-segment, more particularly referred to hereinafter, for imparting motion to the shafts 19 and 20 and any excess of energy which one may receive being immediately imparted to the others.

The shaft 19 is the initial or primary shaft of the apparatus, and on said shaft is secured a water-wheel comprising a circular body portion or piston 26 of the construction more clearly illustrated in Figs. 9, 10, and 11. The periphery of the piston is divided into a series of teeth 27, in each of which is formed a V-shaped slot 28 for the reception of the bearing-pintle 29 of a folding bucket. Each bucket comprises a main body portion 30, curved on a line corresponding or concentric with the periphery of the piston and provided with side wings 31, the width of which gradually lessens from the front to the rear end of the bucket, thereby forming an enlarged mouth at the front end for the reception of water. The bucket is provided on each side of its central line with a partition 32, extending transversely of the bucket between the side rings and the teeth of the piston, and it will be noted on reference to Fig. 10 that these teeth taper gradually from a sharp edge near the front of the bucket to a comparatively broad rear end, in which is formed the slot for the reception of the bucket-pintles.

The piston is disposed within a circular casing 35, the center of which is eccentric to the center of rotation of the shaft 19, so that the passage below the piston will be larger than that above it. The lower central portion of the cylinder 35 has an opening 36 communicating with an enlarged chamber 37, the lower edge of which is open and is disposed within a tank or vessel 38 in such manner that its lower edge will be a trifle above the bottom of said tank and below the water-line of the tank, the water-line being formed by a suitable overflow-pipe, or the tank may remain full at all times and the water flow over the top edge thereof. At one side of the cylinder 35 and communicating therewith by means of a connecting-pipe 39 is a water-tank 40, in which and in the cylinder a constant water-line is maintained by means of float 41, connected by an arm 42 to a valve 43 and a water-inlet pipe 44, communicating with the cylinder, the communicating-pipe 39 being arranged at the surface of the water and any excessive flow which will tend to reduce the water-level resulting in the opening of the valve 43 and the admission of a fresh supply of water, while in the event of the rising of the water in the tank the supply will be immediately cut off.

When the device is set into operation, the tank 38 is elevated, as by a lever 45, until the lower edge of the vessel 36 is sealed against the bottom of the tank. Water is then allowed to enter the cylinder, the governing-tank, and the vessel, after which the latter is placed in communication with the tank by slightly lowering said tank to its normal position. The buckets are so arranged that entering water will effect their outward movement from the piston against the tendency of the bucket-springs 46, the pressure of water against the buckets serving to revolve the piston at a speed dependent upon the volume and pressure of the water. As the buckets successively pass beyond the bottom opening 36 of the cylinder they will be moved to closed positions by the springs 46. The escape of water may be governed by reducing the area of the central opening 36 or by raising or lowering the tank 38 in such manner as to reduce the area of the discharge, as will be readily understood, or any other suitable form of water-wheel may be employed for the purpose and subjected in any desired manner to the action of a volume of water.

On the shafts 19 and 20 are mounted four elongated sleeves or hollow shafts 40', 41', 42', and 43', each being of the construction illustrated in Fig. 17 and mounted on the supporting-shafts by suitable roller or ball bearings 44 for the purpose of reducing friction. Each of the hollow shafts is provided at its inner end with a crank-arm 45, and on each shaft is adjustably secured a radial pin 46, adapted to make contact with such crank-arms, and thereby transmit the movement of the supporting-shafts to the hollow shafts, while at the same time permitting a slight independent forward movement at a higher speed of the hollow shafts under an impetus imparted to them through other connected portions of the mechanism, as more fully set forth hereinafter. On each of the hollow shafts is mounted a fly-wheel 47, which serves to steady the motion and conserve the energy imparted to the shafts, so that the operative movements of the latter may be imparted without jar or shock.

The movement imparted to the intermediate shaft 23 through the medium of the sprocket-wheels and link belt 22 and from certain other sources of energy is imparted to the various hollow shafts through the medium of the mechanism more clearly shown in Fig. 16.

At a point midway between the shafts 19 and 23, and similarly between the shafts 20 and 23, are arranged two shafts 49 and 50, on each of which is secured two pairs of toothed quadrants 51, said quadrants being arranged in diametrically-opposing pairs and so disposed that the pair at the end of the shaft on one side of the machine will be arranged in a plane at right angles to the pair on the opposite side of the machine during certain periods of operation. These quadrants are mounted loosely on their respective shafts and are connected thereto by spiral springs 54, which act to return the quadrants to an initial position after each operation. On the shaft 23 are mounted two quadrants 55, arranged at an angle of ninety degrees from each other, so that one will always act a quarter of a revolution in advance of the other.

Each of the hollow shafts 40', 41', 42', and 43' is provided with a quadrant 56, adapted to intermesh each with one of a pair of quadrants on the intermediate shaft, the opposite quadrant of the pair intermeshing with the quadrant 55 on the central shaft 23. On each of the intermediate shafts 49 and 50 is mounted a cam 58, which is secured to and rotates with the quadrants on said shafts, the cams being engaged by locking-levers 59, mounted on studs 60, carried by the fixed frame, so that each partial rotative movement imparted to the pairs of quadrants by the quadrant 55 will result in the engagement of the locking-lever 59 with the radial face of such cam, holding the cam and quadrants from rotative movement under the retractile force of the spring 54. To each arm 59 is secured a tappet 61, adapted for engagement by a cam 62, one cam being carried by each of the hollow shafts or sleeves and rotating with the quadrant thereon. The various quadrants are so arranged that one of the quadrants on the shaft 23 will always be engaging with one of the pairs of quadrants on one of the intermediate shafts and turning such pairs of quadrants against the action of its returning-spring, and one of such pair of quadrants will at all times be in engagement with one or other of the quadrants on the hollow shafts and imparting to such hollow shafts an impetus under the retractive force of the spring, the various hollow shafts being operated upon in sequence and the movement taking place immediately before and during the transmission of an impulse from such hollow shaft to another connected portion of the apparatus. As the hollow shafts rotate the cams 62 thereon will successively come into contact with the tappet 61 and release the locking-cam and quadrant which is to operate on the immediately-following quadrant carried by such hollow shafts, the cam and quadrant of each hollow shaft being so situated with respect to each other and the tappet-lever and spring-held quadrant that the teeth of the quadrants will properly intermesh to effect the desired operation.

On each power-shaft is secured a cam 64, such cams being arranged each a quarter in advance of the other and adapted to operate in sequence, the operative movement of the cams taking place during the transmission to the hollow shaft of the impetus from the spring-held quadrant and the energy thus transmitted enabling the cam to more properly perform its function.

On each side of the machine are arranged three cylinders 65, 66, and 67 of successively-decreasing capacity and through which air is forced and gradually compressed and reduced in volume, the air as it flows or is forced from cylinder to cylinder being passed through suitable pipes in which are disposed suitable wind-wheels adapted to be set into motion by the passage of the air and to transmit their rotative movements to the intermediate shaft 23, from whence it is transmitted by the mechanism heretofore described to the two shafts 19 and 20 and to the various hollow shafts. In the cylinder 65 is a piston 68, carried by a guided piston-rod, the lower end of which is provided with laterally-projecting pins 70, adapted to be acted upon by a pair of levers 71, fulcrumed on pins 72 and provided at their outer or free ends with counterbalance-weights in which sufficient potential energy may be stored to force the piston from the bottom to the top of the cylinder and to compress air therein, the lower head of the cylinder and the piston being provided with suitable valves 74, which will admit air to the cylinder on the upstroke of the piston and on the downstroke of the piston will permit the passage of the air to the opposite or upper side of the piston, while the valve and the cylinder-head is closed by the pressure of air below the piston.

At an intermediate point in the piston-rod 69 is a horizontal slot 76, in which is fitted a pin 77 on the end of a lever 78, fulcrumed at an intermediate point to the frame and having its opposite end under the control of one of the operating-cams on one of the hollow shafts, said cam serving to move the piston from the upper to the lower position against the action of the counterweights 73 and then releasing the end of the lever and permitting the counterweights to effect the upstroke of the piston. In similar manner the piston 78' of the cylinder 66 is provided with a slotted piston-rod 79, which is acted upon in one direction by another of the operating-cams through the medium of a lever 80, counterweighted levers 81 serving to force the piston upwardly to effect a compression of air within the cylinder. The arrangement of the cams and pistons is such that immediately after the piston 68 starts on its upstroke to compress the air in said cylinder the cam connected with the piston 78' will start to move the latter on the downstroke, the movement being assisted by the air forced from the cylinder 65 to the upper end of the cylinder 66.

Between the two cylinders 65 and 66 there extends a pipe 83, in which is an air-tight casing 84, forming part of a wind-wheel, the construction of which is more clearly shown in Figs. 7 and 8.

The casing or cylinder 84 is provided with a centrally-disposed shaft 85, having one end adapted to a bearing in the wall of the cylinder, the opposite end being reduced in diameter and adapted to a bearing in the end of a shaft 87, extending through the opposite wall of said cylinder. The piston-body 88 is rigidly secured to the shaft 85, and on said shaft is mounted a clutch-disk 89, adapted for longitudinal movement to engage and disengage with the teeth of a mating clutch-disk 90, mounted on the shaft 87, the interengaging teeth of the disks being so formed that when brought into contact they will automatically interlock. The clutch-disk 89 is connected by a number of rods 91 to a disk 92, having a squared orifice through which may pass the squared end 93 of the shaft 85, and this disk, together with its connected clutch-disk 89, is adapted to be moved longitudinally on the shaft by the inclined or wedge-like end 94 of a lever 95, which is fulcrumed on a short shaft 96, extending into the interior of the cylinder. The extreme outer end of the lever 95 is adapted to be acted upon by a cam 97, secured to the stem 98 of a valve 99, which controls the passage of air from the cylinder 65 to the cylinder 66, said valve opening automatically under the pressure of air on the upstroke of the piston in said cylinder. As the valve is opened by the pressure of air the cam or wedge-like end 94 of the lever 95 will act on the disk 92, moving the teeth of the clutching-disk 89 into engagement with the teeth of the disk 90, and thus coupling the wind-wheel shaft 85 to the shaft 87, the shafts being coupled together during all the time air is passing through the pipe 83 between the two cylinders and being automatically disconnected when the valve is closed by means of a spring 100, extending between one of the side walls of the casing and the disk 92.

On the plates which form the piston-body are pivoted a number of buckets 101, to each of which is secured an arm 102, said arm being so arranged that alternate buckets have their arms on opposite sides of the cylinder, but within the casing thereof. On the short shaft 96, which forms a pivot for the lever 95, is pivoted a roller 103, which engages with each of the arms 108, if it be necessary to force the bucket out to that portion of the wall of the cylinder which is formed by the pipe 83 to receive an impulse from the air-current, and each lever is so arranged that as the bucket to which it is attached reaches the full out position it will move the next succeeding bucket half-way out and in position to be engaged by the air-current and moved to the full out position. The cylinder is airtight, so that none of the passing air may escape except through the cylinder-outlet, which forms a part of the pipe 83 and is connected to the upper end of the cylinder 66, and in this manner the tangentially-directed air-current will be forced across the cylinder from the inlet to the exhaust port and impart an impulse to each of the buckets in succession.

The shaft 87 extends across from one side of the machine to the other and is connected to the similar wind-wheel between the cylinders 65 and 66 at the opposite side of the machine, and the clutching mechanism becomes necessary in order to prevent the waste of power which would ensue if both wheels were rigidly connected to the shaft and operated by each other alternately, it being understood from the previously-described arrangement of the operating-cams that the pistons of the cylinders 65 are operated alternately on opposite sides of the machine.

On the shaft 87 is secured a sprocket-wheel 105, which is connected by a link belt 106 to a suitable sprocket-wheel on the intermediate shaft 23, thereby to transmit to said intermediate shaft the rotative movement of the wind-wheels.

Between the cylinders 66 and 67 on each side of the machine extends a conducting-pipe 107, in which is arranged a wind-wheel 108 of a character similar to that mounted between the cylinders 65 and 66, the construction and operation of the device being in all respects similar to that described with reference to the wind-wheel 84.

The wind-wheels 108 are mounted on a shaft 109, having a sprocket-gear 110, which also is connected by the link belt 106 to the intermediate shaft 23, so that all of such shafts revolve continuously, the four wind-wheels being successively clutched to said shaft in accordance with the timed movements of the operating-cams and each shaft being operated alternately by the successive action of the wind-wheels, the energy being transmitted to the shaft 23 and through said shaft to the remaining portions of the mechanism. The operations take place in such order that the movement of a wind-wheel is transmitted through the quadrant mechanism and cams to that one of the hollow shafts having its piston-actuating cam in operative position, thus serving to assist the cams in performing their function.

Each cylinder 67 is arranged on the arc of a circle of which the center is formed by a rock-shaft 111, adapted to suitable bearings in the frame of the machine. To the shaft at points within the framework and in vertical alinement with each row of compression-cylinders and wind-wheels are secured two arms 112 and 113, the former of which is provided with a curved piston-rod 114, connected to a suitable piston 115 within the cylinder 67, which when forced downwardly serves to compress the air within the cylinder 67. The arm 113 is provided with an antifriction-roller 116, adapted to travel on the upper part of a frame 117, which is secured to and reciprocates with the piston-rod 69, said frame having a loop 118, adapted to engage at certain intervals with a hook or catch 119 on the arm 113, so as to draw the arm down with the piston and piston-rod through the operation of one of the hollow-shaft cams and to elevate the piston in the cylinder 67, there being but little or no resistance to the upward movement of the piston 115, owing to the fact that the upper end of cylinder 67 is open to the air. In similar manner the upward movement of the piston-rod 69 under the influence of the counterweighted levers will, through the frame 117 and arms 112 and 113, serve to depress the piston 115 in cylinder 67 and compress the air therein.

Secured to the rock-shaft 111 at points outside the frame are two opposing oscillatory levers 120 121, such levers being oscillated with the rock-shaft and the connected arms and their relative positions being such that on one side of the machine the lever 120 will incline toward one end of the machine and the opposite lever will incline toward the opposite end of the machine, the piston 115 on one side being fully down, while the piston in the similar cylinder on the opposite side of the machine will have completed its upstroke. This connection between the operating mechanisms serves to render the operation of the mechanisms more regular and uniform, and any slight excess of energy which may occur on one side of the machine will be immediately transmitted to the mechanism on the opposite side of the machine, the pressures being thus utilized and the operation regulated automatically without the employment of any auxiliary governing mechanism, while the oscillating levers will in a measure store energy after the manner of pendulums, to be reimparted to the piston-carrying arms.

In order to assist the oscillating-levers during the compression-stroke of the pistons 115, I provide toothed bars 124, having at one end openings for the reception of the lower ends of such operating-levers, and at the opposite ends are racks adapted to be engaged by toothed segments 125, arranged on the shaft 20, the segments being oppositely disposed and acting alternately on bars on opposite sides of the machine. The bars 124 are normally supported at a point intermediate of their length by suitable antifriction-rollers and will be engaged by the toothed segments as the oscillating lever enters the opening at the end of the bar immediately after the passage of the lever beyond a vertical plane while swinging in the direction of the shaft 20. After the segment passes beyond the rack-bar the latter will be free to move by gravity to its initial position. The operative movement of the segments is assisted at the proper time by the impulse transmitted to the shaft from the shaft 23 and its connected mechanism.

The various wind-wheel cylinders and compression-cylinders are preferably surrounded by water-jackets to assist in cooling the air, which is naturally heated by compression, the absorption of the heat effecting a material reduction in the volume of the air, so that it may be more easily compressed in the successive cylinders.

The air is conducted through a pipe 130 to one or other of a pair of cylinders 131 and 132, located at the opposite end of the bedplate, and the pressure there utilized to effect the movement of other connected portions of the mechanism, which movements are to some extent transmitted to the initial shafts 19, or the movement of the initial shaft is transmitted to the operated mechanism in accordance with the supply of power represented by the initial water-wheel or the kinetic energy developed by the moving parts.

The cylinders 131 and 132 are arranged at opposite sides of the base, and in said cylinders are pistons 138, carried by rods 139, the latter being guided by suitable rollers 140 on the frame. Near the lower end of the rods 139 are secured cups 141, which may be weighted to resist the pressure of air entering below the piston, the weights being such that the air-pressure will be just sufficient to raise the piston against the weight of the cup. At the upper end of each rod is mounted a sheave 142, over which passes a chain 143, the lower end of the chain passing around a sprocket-wheel 144, carried on a shaft 145, which finds bearings in the frame. One of these wheels is mounted on the shaft at each side of the frame at a suitable point for cooperation with the piston-rod and the sheave 142, and the shaft receives motion by means of a crank 146, connected to a rod 147, the latter being reciprocated in a manner more clearly described hereinafter. On each chain 143 is secured a metallic rod or bar 148, which practically forms a section of the length of the chain. Through a suitable slot in the rod 148 passes a lifting-finger 149, pivoted at 150 to the rod and normally locked by a bolt 151 in operative position. Should the bolt be disengaged from the lifting-finger, the latter is moved to inoperative position by a spring 154. The bolt 151 is guided in a suitable lug 155, in the outer end of which is pivoted a lever 156, one end of which is operatively connected to the locking-bolt and the opposite end of which is adapted for contact with the under side of the sheave 142.

157 designates a weight, one of which is situated on each side of the machine and in said weight, and extending from end to end thereof is a slot 158 of T shape in plan view. Near the upper portion of the slot is guided a bar 159, which may be moved into and out of alinement with the slot, but is normally held in position to close the same by a spring 160.

On each side of the apparatus is arranged a shaft 161, on one of which is secured a gear-wheel 162 and on the other a plain wheel 163. Each of the shafts 161 is provided with a crank 164, connected by a rod 165 to a bar 166, guided in any suitable manner and connected to any mechanism or machine which is to utilize the power.

Each wheel 162 and 163 is provided with four spindles 167, arranged at angles of ninety degrees, and on each spindle is mounted an antifriction-roller 168. The spindle and roller are adapted to enter the T-shaped slot 158 in the weight 157, and the operation of this portion of the mechanism may be briefly described as follows:

Air under pressure enters either the cylinder 131 or 132 and elevates the piston therein, causing an upward movement of the piston-rod 139 and the sheave 142. At this time one of the weights 157 is carried by one of the rollers 168 in a position illustrated in Fig. 1. The initial movement causes the finger 149 to enter a slot 169 in the weight. At this moment the connecting-rod 147 of the crank 146 receives an inward movement and oscillates the shaft 145 and the wheel 144, causing a sharp upward movement of the chain 143 and elevating the weight 157 to the position shown by dotted lines in Fig. 1. During this upward movement the roller 168 in alinement with the weight will enter the top of the groove 158, forcing the spring 160 and the bolt 159 from locking position and permitting the roller to pass beneath the bolt, the latter automatically returning to locking position and hanging the weight on the wheel. This movement on the part of the wheel 144 causes the weight to be supported during its upward movement by the sheave 142 and its attached piston 138 and causes a downward movement of the piston in its cylinder, the air therein being compressed and forced through a valve 170 to a secondary cylinder 171, common to both the cylinders 131 and 132 and receiving air alternately therefrom.

The wheels on opposite sides of the apparatus operate alternately, and the reversal of the movement takes place when one wheel has been moved until its attached weight is in the horizontal plane of the axis of the wheel and the weight of the opposite wheel is at an angle of forty-five degrees to such axis. While the weight is free to act and does act positively to effect the depression of the piston during its upward travel, it does not effect any movement of the wheel on which it is hung until on the downward movement of the sheave 142 the lower surface of the latter engages with a pivoted lever 156, causing a movement of the bolt 151 to the unlocking position and releasing the carrying-finger 149 from the weight.

At the top of the machine there is mounted a shaft 172, carrying a fly-wheel 173 and a pinion 174, the latter intermeshing with the gear-wheel 162 and the relative diameters of the gear-wheel and pinion being such that the latter will be revolved eight times by one revolution of the gear-wheel.

In order to facilitate the return movement of the weight-raising wheel after the weight has been delivered, the chain 143 is secured to the wheel at 176, and the periphery of the wheel is recessed at 177 for the reception of a roller 178, which normally is projected beyond the peripheral line of the wheel by a spring 179. During the weight-raising movement the run of the chain below the weight will become slackened, as indicated by full lines in Fig. 21, while that portion of the chain on the opposite side of the wheel will be held taut. When the weight is fully raised, the spring-pressed roller will be in the position shown by dotted lines in Fig. 20, being pressed into the recess in the periphery of the wheel by the tension of the chain. When the weight is delivered, the tension on the chain is slackened, and the spring will force the roller out beyond the peripheral line of the chain, altering the position of the slack to the position shown in Fig. 21.

In the cylinder 171, before referred to, there is arranged a weighted piston 182, having an upper piston-rod 183 and a lower piston-rod 184, extending out through the top and bottom of the cylinder, respectively, and being guided by suitable antifriction-rollers. In the base of the piston is a small recess 186, in which fit the ends of two levers 187, pivoted intermediate of their length at 188, the opposite ends of said levers being connected one to each of the piston-rods 139. As each piston-rod 139 is moved down its connected lever will act on the weight 182 to cause an upward movement of the same, and the compressed air will then enter from the cylinder below the piston 138 to the cylinder 171 through the valve 170, causing a slight upward movement of the weight, the valve closing after the weighted piston has reached the end of its upstroke.

In order to assist in the upward movement of the weighted piston, the upper piston-rod of the latter is operated upon by an escapement mechanism of the construction more clearly shown in Figs. 14 and 15.

In suitable bearings in the framework are journals for the support of a transversely-disposed shaft 190, having a cam 191 adapted to effect the elevation of the weighted piston and the upper rod once during each two revolutions of the shaft, the latter receiving motion, in the manner hereinafter described, at a rate of speed double that of the piston. The upper end of the piston-rod 183 is bent laterally and is rigidly secured to a horizontally-disposed bar or plate 193, to which is fulcrumed a secondary plate 194, the connecting-pin between the two plates being surrounded by a torsion-spring 194', the opposite ends of which are connected to the respective plates, so that when the spring is free to operate it will move the lowermost plate to a position at right angles to that of the upper plate. Such movement is at times prevented by a locking device 195 between the plates, the arrangement of such locking device being illustrated in Figs. 14 and 15, wherein the plates are shown somewhat separated in order to more clearly illustrate the construction, although it will be understood that in practice such plates will be arranged more closely together. In the operation of this portion of the mechanism the cam in rotating will by contact with the plate 194 elevate the connected plate 193 and the piston-rod. On continuing the movement and still in contact with the lowermost plate the cam will slightly tilt the plate and cause the disengagement of the catch, permitting the spring to rotate the lower plate and altering the position of such lower plate in such manner that on the next subsequent movement of the cam the latter will merely engage against the side of the lower plate and act to return said lower plate to its initial position without effecting any vertical movement thereof, the plate being then in readiness on the next revolution to be acted upon and raised by said cam.

In order to partly raise the weighted piston 182 and allow compressed air to enter the cylinder 171 at the starting of the apparatus, I provide a hand-operated lever 196, fulcrumed at 197 under the base of the machine, the inner end of the lever being adapted for contact with the lower end of the piston-rod 184. The outer end of the lever is adapted to a notched or serrated locking device 198, by which the lever may be locked in any desired position to assist in stopping the apparatus when necessary.

Supported by the framework at a suitable point adjacent to the cylinder 171 are two superposed cylinders 200 201, the upper of which is provided with a piston 202, connected to a rod 203, having a suitable guide or support. On the piston-rod is a weight 204, having a central slot or opening 205 (see Fig. 18) for the reception of one end of a lever 206, fulcrumed at 207 on the fixed frame and having its opposite end arranged under the shaft 172 and adapted to be operated upon by a cam 208, carried by said shaft. The cylinder 200 is connected by a suitable pipe 209 to the cylinder 171, and in said pipe is a valve 210, adapted to be moved to a closed position when the pressure of air is equalized on opposite sides of the valve by a suitable spring. In the lower end of the cylinder 200 is an opening 212, leading to the ports of the lower cylinder 201, said openings being controlled by a valve 213, which is connected to the valve 210 and is movable therewith, the opening of the valve 210 causing a movement of the valve 212' to the closed position, and on the closing of the valve 210 the valve 212' will be opened to permit the flow of air from the cylinder 200 to the cylinder 201. When the weighted piston 182 starts to descend, the piston 202 will start to ascend, being moved upward partly by the pressure of air from the cylinder 171 and partly by the action of the cam 208 on the weight 204. When the air starts to flow through the pipe 209, the valve 210 will be opened and the valve 212' will be closed to prevent any passage of air to the lower cylinder 201.

In the cylinder 201 is a piston 213, connected by a piston-rod and connecting-rod 147 to the crank 146 of the weight-raising wheels. Leading into the cylinder 201 are two ports or passages 215 and 216, one of which is always in communication with one end of the cylinder 201. The travel of air through one or other of the ports is governed by a valve 217, mounted on a pivot 218 and having an arm 219, by which it is connected to a valve-controlling rod 220, which extends parallel with the piston-rod and is provided with two collars 221, spaced for a distance somewhat less than the stroke of the piston and adapted for contact by a tappet-arm 222 at each end of a piston-stroke, suitable springs 223 being placed on the valve-rod between the collar and tappet-arm to take up the shock. In each of the ports 215 216 is a valve 224 for controlling the flow of air through the port.

Up to this time the air has not been expanded to any material extent, any expansion which may have occurred between the successive cylinders being neutralized by recompression until the air in the final cylinder of the series is highly compressed, and in escaping therefrom its expansive force is utilized by passing it through a wind-wheel 226, mounted on the shaft 190, such wind-wheel being of a construction substantially similar to that employed in connection with the wind-wheels between the primary compression-cylinders and previously described. The air is led from the horizontally-disposed cylinder 201 to the final wind-wheel through a pipe 227, the flow of air being governed by suitable valves 228, arranged within the cylinder 201 and having tappet-arms adapted to be engaged by the piston. If the piston be in the position illustrated in Fig. 6 and about beginning the outstroke, the valve with which the piston is in contact will be automatically closed by the passage of the piston, so that air entering through the main inlet-port cannot escape through the pipe 227. As the piston nears the end of its outstroke it makes contact with the tappet-arm of a second and similar valve and opens said valve, permitting the air to pass through the pipe 227 to the final wind-wheel 226, the latter having an exhaust open to the air, so that the expansive force of the compressed air may be fully utilized.

In order to keep the shaft 190 rotating at a uniform speed, said shaft is provided with a fly-wheel 230, which is kept in continuous rotation by the successive impulses given to the wind-wheel 226, the latter while practically in continuous motion having an irregular movement, which renders it desirable to employ a suitable clutching mechanism which will permit of the free movement of the shaft and fly-wheel independent of the movement of the wind-wheel. A suitable clutch for this purpose is illustrated on an enlarged scale in Figs. 19 and 19$^a$. On the shaft 190 is mounted a toothed wheel 231, with which may engage a series of pivoted teeth 232, carried by the hub 233 of the wind-wheel, the movement of the hub in the direction of the arrow causing the engagement of the clutching-teeth and transmitting the movements of the wind-wheel to the shaft. On the other hand, should the speed of rotation of the shaft be greater than that of the wind-wheel such shaft is allowed perfect freedom of movement.

In order to transmit some of the energy of the primary shaft 19 to the shaft 172, both shafts are provided with sprocket-wheels 234, connected by a link belt 235.

Where water is passing through pipes from any one point to another, I preferably employ as the initial wheel of the series a water-wheel constructed in a manner similar to that employed between the air-compression cylinders as a wind-wheel, the water-pressure serving to impart sufficient energy to all of the connected portions of the mechanism to keep them in continuous operation.

While the construction herein described and illustrated in the accompanying drawings is the preferred form of the device, it is obvious that various changes in the form, proportions, size, and minor details of the structure may be made without departing from the spirit or sacrificing any of the advantages of my invention.

Having thus described the invention, what I claim is—

1. In an apparatus of the class described, the combination with an initial water-wheel, of a series of alternately-operated air-compression cylinders receiving power from the water-wheel, wind-wheels arranged between successive cylinders and adapted to be operated by the air-currents between the cylinders, and a series of mutually-connected mechanisms having independent connections each with one of the wind-wheels, all of such mechanisms, together with the water-wheel being connected to a common power-shaft.

2. The combination with an initial source of power, of a plurality of cylinders arranged alternately for the compression of air and for the conversion of air-pressure into motion, of a plurality of coöperatively-connected mechanisms operable and operating at different speeds and serving to store the energy of the operating-cylinders to the compression-cylinders.

3. The combination with a frame, of a plurality of revoluble shafts, means for driving such shafts at different speeds, and means for connecting such shafts for the transmission of the higher speeds to the shafts of lower speed at predetermined intervals.

4. The combination with a pair of air-compression cylinders of different area and provided with pistons adapted for simultaneous movement in opposite directions, of an air-pipe connecting said cylinders, and a wheel situated in said pipe and operable by the current of air passing from one cylinder to the other.

5. The combination with a plurality of air-compression cylinders of gradually-decreasing area, of connecting-pipes connecting the cylinders in series, and wheels arranged in said pipes and operable by the current of air passing therethrough.

6. In an apparatus of the class described, the combination with a pair of revoluble shafts, of hollow shafts carried by each of the revoluble shafts, means for connecting the hollow shafts to the revoluble shafts, means for independently operating all of the shafts, and means for imparting increased energy to the hollow shafts at regular predetermined intervals.

7. The combination with a pair of shafts, of hollow shafts mounted on each of the pair and operably connected thereto, air-compression cylinders, pistons disposed in said cylinders and operatively connected to the hollow shafts, auxiliary cylinders having air-actuated pistons connected to the pairs of shafts, and means for storing the energy of the air-actuated pistons and for transmitting such energy to the hollow shafts during the operative movement of such shafts on the pistons of the compression-cylinders.

8. In an apparatus of the class described, the combination with a frame, of a pair of revoluble shafts, sprocket-wheels and belt connections between the shafts, a water-wheel operatively connected to one of said shafts, an air-compression cylinder, counterweighted levers connected to the pistons thereof for compressing air within the cylinder, hollow shafts mounted on said revoluble shafts, cams carried by the hollow shafts for moving the piston against the action of the counterweighted levers, a wind-wheel operable by the current of air flowing from the compression-cylinder, and mechanism operatively connecting the shaft of the wind-wheel to all of said shafts.

9. In an apparatus of the class described, the combination with the frame, of a pair of revoluble shafts, sprocket-wheels and belt connections between said shafts, hollow shafts mounted on the revoluble shafts, said hollow shafts being connected to but capable of slight rotative movement independent of the revoluble shaft, an initial source of energy connected to one of said shafts, an air-compression cylinder, a piston therein, counterweighted levers connected to the piston for effecting the compression-stroke thereof, an operating-cam on the hollow shaft for effecting the return movement of the piston, a wind-wheel connected to the compression-cylinder and operable by the flow of the current of air therefrom, mechanism connecting the shaft of the wind-wheel to the pair of revoluble shafts for continuous movement thereof, means for storing a portion of the energy of the wind-wheel shaft, and means for imparting a portion of such stored energy to the hollow shaft immediately before the operation of the hollow-shaft cam on the piston of the compression-cylinder.

10. In a device of the class specified, a plurality of connected shafts, a water-wheel and a series of wind-wheels operatively connected to said shafts, a series of air-compression cylinders between which the wind-wheels are situated, an oscillator having a piston for forcing the air from the final cylinder of the series, a rack-bar connected to said oscillator, and a toothed segment carried by one of the shafts and adapted to intermesh with said rack-bar.

11. In a device of the class specified, a plurality of shafts, means for connecting the same for the transmission of power from one to the other, a plurality of air-compression cylinders of gradually-decreasing area, pipes connecting said cylinders, wind-wheels arranged in said pipes, means for clutching the wind-wheels to the shafts during the operative movement of said wind-wheels, and means for automatically disconnecting the wind-wheels from the shafts when the flow of air ceases, substantially as specified.

12. The combination with a plurality of connected shafts, of an initial source of energy connected to one of such shafts, a plurality of air-compressing cylinders, pistons disposed in said cylinders, means for operating said pistons from the several shafts and for imparting to the operating-shafts an additional impetus at the beginning of each piston-operating movement, pipes connecting the several cylinders, wind-wheels disposed in said pipes, and means for automatically connecting and disconnecting the wind-wheels and shafts, substantially as specified.

13. The combination with a plurality of shafts, of means for connecting said shafts, an initial source of energy connected to one of the shafts, a series of air-compressing cylinders of gradually-decreasing area, pistons disposed in said cylinders, counterweights for effecting the compression-strokes of the several pistons, means for connecting the pistons to the shafts for effecting the out-stroke of the pistons, pipes connecting the cylinders in series, wind-wheels disposed in said pipes and adapted to be acted upon in alternation by the current of air passing from one cylinder to the other, and means controlled by the pressure of the air for automatically connecting and disconnecting said wind-wheels and shafts.

14. The combination with a plurality of shafts, of means for connecting the shafts, an initial source of energy connected to one of said shafts, a plurality of air-compressing cylinders arranged in series, the final cylinder of the series being curved in form, wind-wheels adapted to be acted upon by the current of air passing between connected cylinders, means controlled by the pressure of the air for automatically connecting and disconnecting the wind-wheels and shafts, oscillating levers arranged in pairs, one of said levers being connected to the piston of each of the curved cylinders, and means for imparting operative movement to said oscillating levers.

15. In a device of the class specified, a pair of air-cylinders adapted to be operated alternately, pistons in said cylinders, mechanism operatively connected to the pistons, a third cylinder with which both of the alternately-operated cylinders communicate, a weighted piston in said third cylinder and levers connecting the several pistons, substantially as specified.

16. In a device of the class specified, a pair of alternately-operating pistons, cylinders in which said pistons are contained, mechanism operatively connected to said pistons, an auxiliary cylinder in communication with both of the first-named cylinders, a weighted piston in the auxiliary cylinder, and means for mechanically connecting the weighted piston to the alternately-operated pistons.

17. In a device of the class specified, the combination with a pair of cylinders, of pistons disposed in said cylinders, mechanism operatively connected to said pistons, an auxiliary cylinder in communication with a pair of cylinders, a weighted piston in said auxiliary cylinder, mechanism connecting the first-named pistons and the weighted piston to effect an initial upward movement of the latter, a vertically-disposed piston arranged above the auxiliary cylinder, a cylinder in which said vertically-disposed piston is contained, a horizontally-disposed power-cylinder adapted to receive air from the vertically-disposed cylinder, a piston in said power-cylinder, mechanism operatively connected to said piston, and a wind-wheel in communication with said power-cylinder.

18. In a device of the class specified, the combination with a plurality of connected shafts, of a series of air-cylinders, pistons arranged in said cylinders, mechanism connecting the pistons to the shaft for operating the same at different speeds, and means for equalizing the speeds and for maintaining a constant speed of the final shaft of the series.

In testimony that I claim the foregoing as my own I have hereto affixed my signature in the presence of two witnesses.

OLE E. WAXEL.

Witnesses:
IRA VAUGHAN,
E. P. VAUGHAN.